United States Patent
Hughes et al.

(10) Patent No.: US 7,840,780 B2
(45) Date of Patent: Nov. 23, 2010

(54) SHARED RESOURCES IN A CHIP MULTIPROCESSOR

(75) Inventors: William A. Hughes, San Jose, CA (US); Vydhyanathan Kalyanasundharam, San Jose, CA (US); Kiran K. Bondalapati, Los Altos, CA (US); Philip E. Madrid, Austin, TX (US); Stephen C. Ennis, Austin, TX (US)

(73) Assignee: Globalfoundries Inc., Grand Cayman (KY)

( * ) Notice: Subject to any disclaimer, the term of this patent is extended or adjusted under 35 U.S.C. 154(b) by 382 days.

(21) Appl. No.: 12/098,303

(22) Filed: Apr. 4, 2008

(65) Prior Publication Data
US 2008/0184009 A1 Jul. 31, 2008

Related U.S. Application Data

(62) Division of application No. 10/957,250, filed on Oct. 1, 2004, now Pat. No. 7,383,423.

(51) Int. Cl.
*G06F 9/00* (2006.01)

(52) U.S. Cl. .......................... 712/30; 712/28

(58) Field of Classification Search .................. 712/28, 712/30
See application file for complete search history.

(56) References Cited

U.S. PATENT DOCUMENTS

| 6,401,174 | B1 | 6/2002 | Hagersten et al. |
| 6,665,788 | B1 | 12/2003 | Hughes |
| 6,976,155 | B2 | 12/2005 | Drysdale et al. |
| 2002/0029358 | A1 | 3/2002 | Pawlowski et al. |

*Primary Examiner*—Alford W Kindred
*Assistant Examiner*—Benjamin P Geib
(74) *Attorney, Agent, or Firm*—Lawrence J. Merkel; Meyertons, Hood, Kivlin, Kowert & Goetzel, P.C.

(57) ABSTRACT

In one embodiment, a node comprises a plurality of processor cores and a node controller configured to receive a first read operation addressing a first register. The node controller is configured to return a first value in response to the first read operation, dependent on which processor core transmitted the first read operation. In another embodiment, the node comprises the processor cores and the node controller. The node controller comprises a queue shared by the processor cores. The processor cores are configured to transmit communications at a maximum rate of one every N clock cycles, where N is an integer equal to a number of the processor cores. In still another embodiment, a node comprises the processor cores and a plurality of fuses shared by the processor cores. In some embodiments, the node components are integrated onto a single integrated circuit chip (e.g. a chip multiprocessor).

10 Claims, 4 Drawing Sheets

US 7,840,780 B2

SHARED RESOURCES IN A CHIP MULTIPROCESSOR

This application is a divisional application of U.S. patent application Ser. No. 10/957,250, filed on Oct. 1, 2004 now U.S. Pat. No. 7,383,423, which is incorporated herein by reference.

BACKGROUND

1. Field of the Invention

This invention is related to the field of chip multiprocessors (CMP) and, more particularly, to sharing of resources in a CMP.

2. Description of the Related Art

Chip multiprocessors (CMPs) are becoming more popular in the present age. A CMP has two or more processor cores implemented on the same integrated circuit. CMPs may be a more efficient use of the millions of transistors that may be included on an integrated circuit than, for example, a more elaborate single processor.

CMPs include multiple processor cores, and may include other circuitry as well. For example, circuitry to interface the processor cores to the rest of the computer system may be included. Designing the additional circuitry to be efficient and to provide appropriate functionality is a challenge in CMPs.

SUMMARY

In one embodiment, a node comprises a plurality of processor cores and a node controller coupled to the plurality of processor cores. The node controller is configured to receive a first read operation addressing a first register in the node controller, and is configured to return a first value in response to the first read operation. The first value returned is dependent on which processor core of the plurality of processor cores transmitted the first read operation.

In another embodiment, a node comprises, integrated onto a single integrated circuit chip, a plurality of processor cores and a node controller coupled to the plurality of processor cores. The node controller comprises a queue shared by the plurality of processor cores. The queue is configured to store communications transmitted by each of the plurality of processor cores to the node controller; and the node controller is configured to schedule the communications from the queue for transmission out of the node. The plurality of processor cores are configured to transmit communications at a maximum rate of one every N clock cycles, where N is an integer equal to a number of the plurality of processor cores.

In still another embodiment, a node comprises, integrated onto a single integrated circuit chip, a plurality of processor cores and a plurality of fuses. Each of the plurality of fuses is shared by the plurality of processor cores. The plurality of fuses are selectively blown during manufacture of the integrated circuit chip to represent a plurality of values used by the plurality of processor cores.

BRIEF DESCRIPTION OF THE DRAWINGS

The following detailed description makes reference to the accompanying drawings, which are now briefly described.

Figure 1:
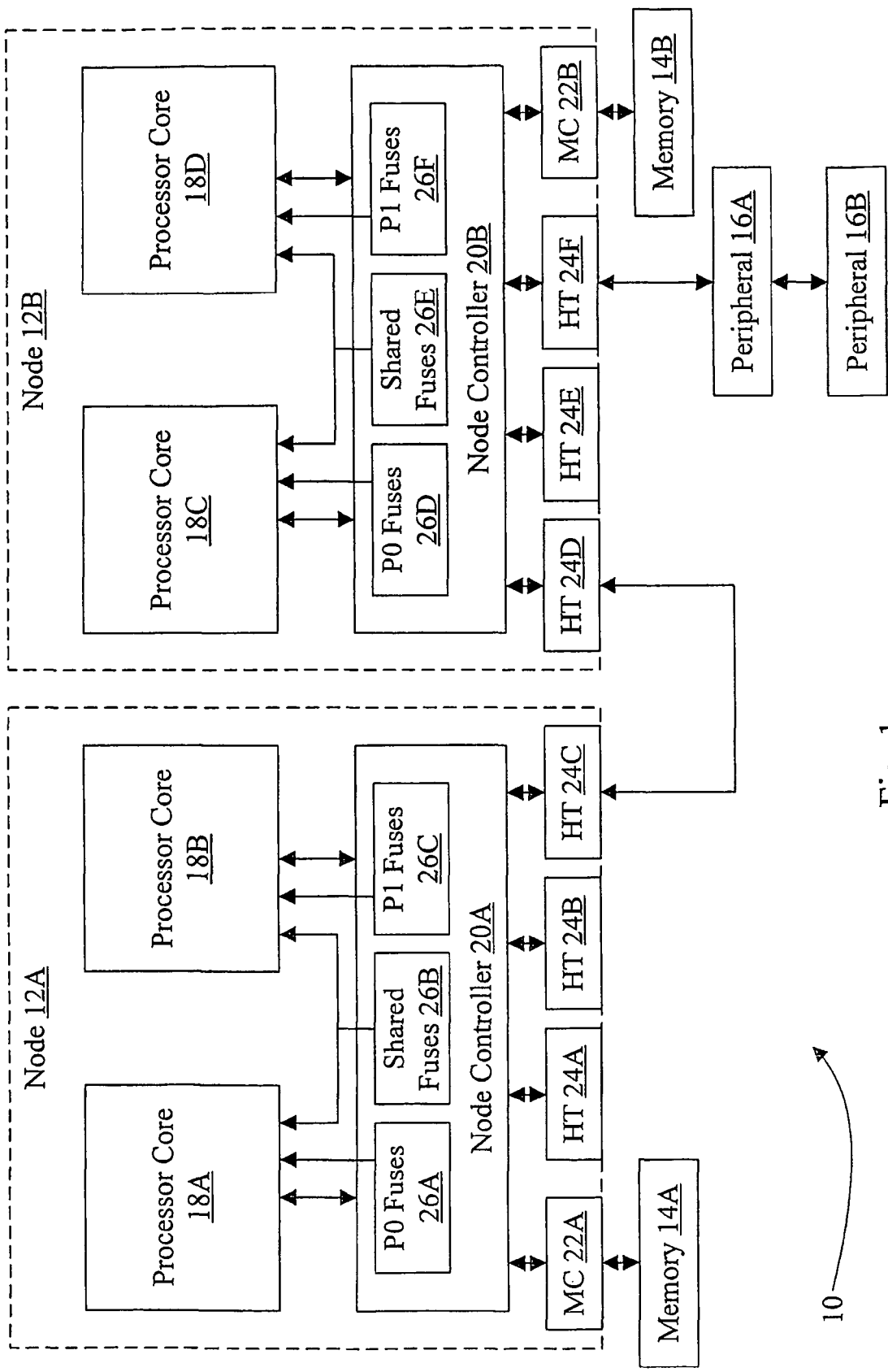
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a computer system 10 is shown. In the illustrated embodiment, the computer system 10 includes nodes 12A-12B, memories 14A-14B, and peripheral devices 16A-16B. The nodes 12A-12B are coupled, and the node 12B is coupled to the peripheral devices 16A-16B. Each of the nodes 12A-12B are coupled to respective memories 14A-14B. The node 12A comprises processor cores 18A-18B coupled to a node controller 20A which is further coupled to a memory controller 22A and a plurality of HyperTransport™ (HT) interface circuits 24A-24C. The node 12B similarly comprises processor cores 18C-18D coupled to a node controller 20B which is further coupled to a memory controller 22B and a plurality of HT interface circuits 24D-24F. The HT circuits 24C-24D are coupled (via an HT interface, in this embodiment) and the HT circuit 24F is coupled to the peripheral device 16A, which is coupled to the peripheral device 16B in a daisy-chain configuration (using HT interfaces, in this embodiment). The memory controllers 22A-22B are coupled to the respective memories 14A-14B. In one embodiment, each of the nodes 12A-12B may be a single integrated circuit chip comprising the circuitry shown therein in FIG. 1. That is, each node 12A-12B may be a chip multiprocessor (CMP). Other embodiments may implement the nodes 12A-12B as two or more separate integrated circuits, as desired. Any level of integration or discrete components may be used.

In the illustrated embodiment, each of the node controllers 20A-20B includes sets of fuses. The fuses are grouped as shown in FIG. 1. For example, the node controller 20A includes P0 fuses 26A, shared fuses 26B, and P1 fuses 26C. The P0 fuses 26A are coupled to the processor core 18A but not the processor core 18B, while the P1 fuses 26C are coupled to the processor core 18B but not the processor core 18A. The shared fuses 26B are coupled to each of the processor cores 18A-18B. Similarly, the node controller 28B includes P0 fuses 26D coupled to the processor core 18C and not the processor core 18D; P1 fuses 26F coupled to the processor core 18D and not the processor core 18C; and shared fuses 26E coupled to each of the processor cores 18C-18D.

Generally, the fuses 26A-26F may be selectively blown during the manufacturing process for the nodes 12A-12B to represent a plurality of values. The values may describe various properties for circuitry in the node and may be fixed due to the fixed nature of the fuses after manufacture. That is, fuses are either blown or not blown at manufacture, and provide a fixed value thereafter. As used herein, a fuse may include any electrical structure that provides a first binary value (e.g. zero or one) when not blown and the opposite binary value when blown. A single fuse may provide a binary value (e.g. enable or disable), or multiple fuses may be logically grouped to form multibit values. Fuses may be blown in any desired fashion (e.g. a laser may be used to cut a wire in the fuse, a high voltage may be applied to blow the fuse, a wire may be physically cut, etc.).

The shared fuses 26B and 26E are shared by the processor cores in the node. In some cases, the shared fuses 26B and 26E may describe various node properties. That is, the properties may apply to the node as a whole, rather than to individual processor cores. In some embodiments, the node properties may include the maximum and minimum operating frequencies for the node and the maximum and minimum power supply voltages for the node. In one implementation, the node may include pins that may be encoded to select the power supply voltage and operating frequency of the node. The maximum and minimum values indicated by the fuses may be used to limit the selected power supply voltage and operating frequency to values known to work for the node (e.g. by testing the node at various frequencies and voltages during the manufacturing process). That is, the fuses describing the maximum and minimum values may be selectively blown to establish the maximum and minimum values according to test results during manufacturing. Another example of values represented by the shared fuses 26B and 26E may be indications of whether or not one or more of the HT circuits 24A-24C (for shared fuses 26B) or HT circuits 24D-24F (for shared fuses 26E) are disabled.

On the other hand, the P0 fuses 26A and 26D and the P1 fuses 26C and 26F may describe processor-core specific properties. For example, the P0 fuses 26A and 26D and P1 fuses 26C and 26F may include fuses that program the redundancies in the caches or other random access memory arrays in the particular processor core to which they are coupled. Since the tests of these memory arrays (and the errors to be corrected by substituting the redundant rows/columns) may have different results for different processor cores, the fuses for each processor core may be blown differently to select the appropriate redundant storage elements. Other processor-core specific properties may include various processor core features that may be enabled or disabled to provide product differentiation (e.g. in terms of levels of performance or functionality) using the same underlying design. In other cases, the processor core features may be enabled or disabled for the node as a whole, and thus may be node properties described by the shared fuses 26B and 26E.

The node controller 20A may generally be configured to receive communications from the processor cores 18A-18B, the memory controller 22A, and the HT circuits 24A-24C and to route those communications to the processor cores 18A-18B, the HT circuits 24A-24C, and the memory controller 22A dependent upon the communication type, the address in the communication, etc. In one embodiment, the node controller 20A includes a system request queue (SRQ) into which received communications are written by the node controller 20A. The node controller 20A may schedule communications from the SRQ for routing to the destination or destinations among the processor cores 18A-18B, the HT circuits 24A-24C, and the memory controller 22A. The node controller 20B may be similar with regard to the processor cores 18C-18D, the HT circuits 24D-24F, and the memory controller 22B. Operation of the node 12A and its components will be discussed in more detail below. Operation of the node 12B and its components may be similar.

Generally, the processor cores 18A-18B may use the interface(s) to the node controller 20A to communicate with other components of the computer system 10 (e.g. peripheral devices 16A-16B, processor cores 18B-18D, the memory controllers 22A-22B, etc.). The interface may be designed in any desired fashion. Cache coherent communication may be defined for the interface, in some embodiments. In one embodiment, communication on the interfaces between the node controller 20A and the processor cores 18A-18B may be in the form of packets similar to those used on the HT interfaces. In other embodiments, any desired communication may be used (e.g. transactions on a bus interface, packets of a different form, etc.). In other embodiments, the processor cores 18A-18B may share an interface to the node controller 20A (e.g. a shared bus interface). Generally, the communications from the processor cores 18A-18B may include requests such as read operations (to read a memory location or a register external to the processor core) and write operations (to write a memory location or external register), responses to probes (for cache coherent embodiments), interrupt acknowledgements, system management messages, etc.

The memories 14A-14B may comprise any suitable memory devices. For example, a memory 14A-14B may comprise one or more RAMBUS DRAMs (RDRAMs), synchronous DRAMs (SDRAMs), double data rate (DDR) SDRAM, static RAM, etc. The address space of the computer system 10 may be divided among memories 14A-14B. Each node 12A-12B may include a memory map (e.g. in the node controller 20A) used to determine which addresses are mapped to which memories 14A-14B, and hence to which node 12A-12B a memory request for a particular address should be routed. The memory controllers 22A-22B may comprise control circuitry for interfacing to the memories 14A-14B. Additionally, the memory controllers 22A-22B may include request queues for queuing memory requests, etc.

The HT circuits 24A-24F may comprise a variety of buffers and control circuitry for receiving packets from an HT link and for transmitting packets upon an HT link. The HT interface comprises unidirectional links for transmitting packets. Each HT circuit 24A-24F may be coupled to two such links (one for transmitting and one for receiving). A given HT interface may be operated in a cache coherent fashion (e.g. between nodes 12A-12B) or in a non-coherent fashion (e.g. to/from peripheral devices 16A-16B). In the illustrated embodiment, the HT circuits 24C and 24D are coupled via coherent HT links for communicating between the nodes 12A-12B. The HT circuits 24A-24B and 24E are not in use, and the HT circuit 24F is coupled via non-coherent links to the peripheral devices 16A-16B.

The peripheral devices 16A-16B may be any type of peripheral devices. For example, the peripheral devices 16A-16B may include devices for communicating with another computer system to which the devices may be coupled (e.g. network interface cards, circuitry similar to a network interface card that is integrated onto a main circuit board of a computer system, or modems). Furthermore, the peripheral devices 16A-16B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 18A-18D may comprise circuitry that is designed to execute instructions defined in a given instruction set architecture. That is, the processor core circuitry may be configured to fetch, decode, execute, and store results of the instructions defined in the instruction set architecture. The processor cores 18A-18D may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g. peripheral component interconnect (PCI), PCI express, etc.), etc.

It is noted that, while the computer system 10 illustrated in FIG. 1 comprises two nodes 12A-12B, other embodiments may implement one node or more than two nodes. Similarly, each node 12A-12B may include two or more processor cores, in various embodiments. Various embodiments of the computer system 10 may include different numbers of HT interfaces per node 12A-12B, differing numbers of peripheral devices coupled to one or more of the nodes, etc.

Figure 2:
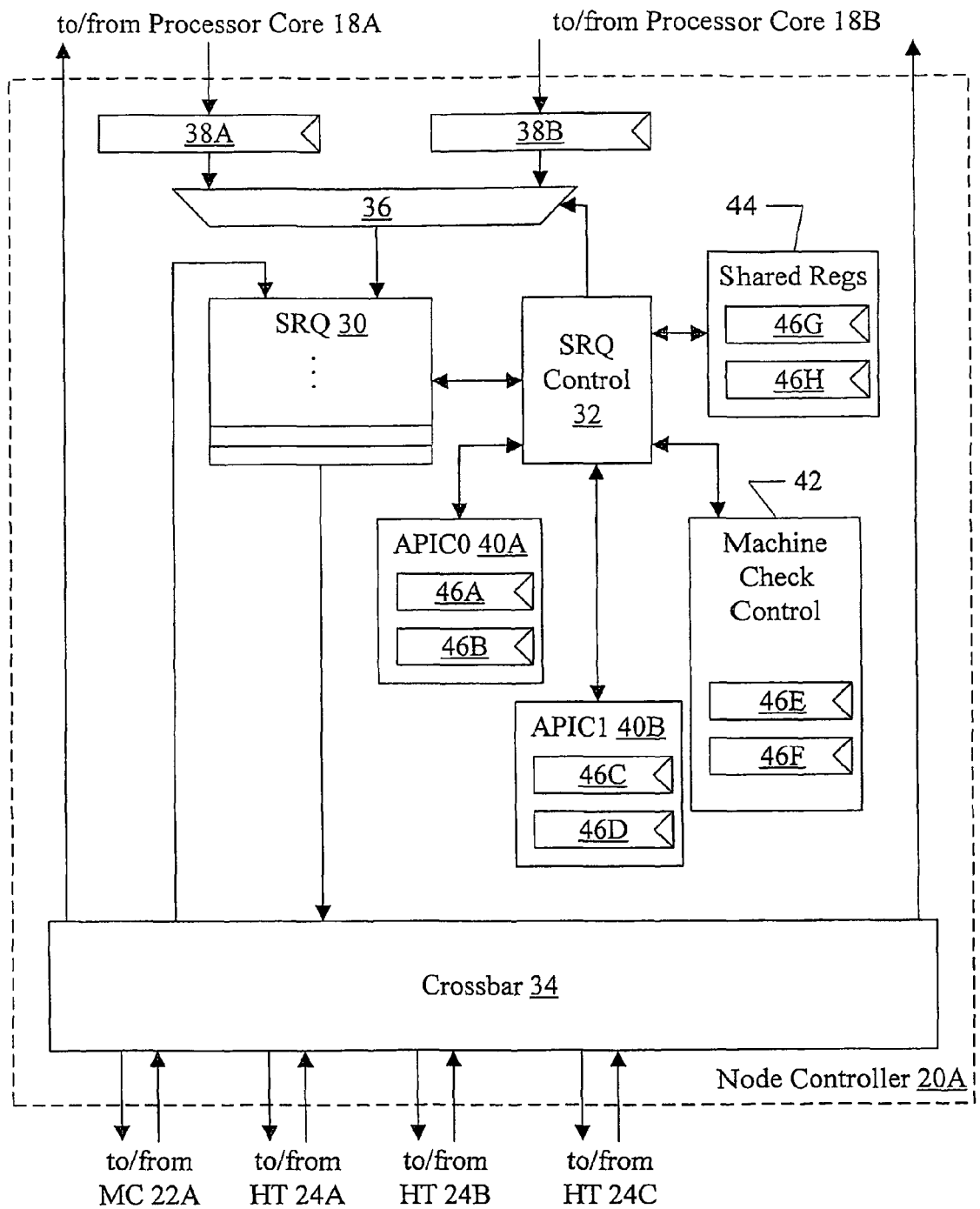
FIG. 2 is a block diagram of one embodiment of a node controller shown in FIG. 1.

Turning now to FIG. 2, a block diagram illustrating one embodiment of a portion of the node controller 20A is shown. Not shown in FIG. 2 are the fuses 26A-26C shown in FIG. 1. In the illustrated embodiment, the node controller 20A includes a system request queue (SRQ) 30, an SRQ control unit 32, a crossbar 34, a multiplexor (mux) 36, a set of input flops 38A-38B, an advanced programmable interrupt controller 0 (APIC0) 40A, an APIC1 40B, a machine check control unit 42, and a set of shared registers 44. The flops 38A-38B are coupled to receive communications from the processors 18A-18B, respectively, and are coupled to the mux 36. The mux 36 is coupled to receive selection controls from the SRQ control unit 32 and is coupled to the SRQ 30. The SRQ control unit 32 is coupled to the SRQ 30, the APIC0 40A, the APIC1 40B, the machine check control unit 42, and the shared registers 44. The SRQ 30 is coupled to the crossbar 34, which is further coupled to receive and provide communications to the HT circuits 24A-24C and the memory controller 22A, and to provide communications to the processors 18A-18B. In the illustrated embodiment, the APIC0 40A may include one or more registers such as registers 46A-46B. Similarly, the APIC1 40B may include one or more registers such as registers 46C-46D and the machine check control unit 42 may include one or more registers such as registers 46E-46F. The shared registers 44 may comprise one or more registers such as registers 46G-46H.

The SRQ 30 is configured to store external communications (e.g. requests, responses, etc.) received by the node 12A (e.g. through the HT circuits 24A-24C) as well as internal communications generated by the memory controller 22A (e.g. probes for read/write requests transmitted to the memory controller 22A, read responses providing data for a read request, etc.) and the processor cores 18A-18B (e.g. requests, responses, etc.). Generally, the SRQ 30 comprises multiple entries, each entry configured to store a different communication. The SRQ control unit 32 may be configured to allocate entries for received communications, and may be configured to schedule communications for transmission through the crossbar 34. Additionally, the SRQ control unit 32 may be configured to updated state in the SRQ 30 for a given communication in response to completion of various internal activities. For example, if a probe is in the SRQ 30 and the corresponding responses from the processor cores 18A-18B are received for the probe, the SRQ control unit 32 may update the state in the entry storing the probe to record the receipt of the response and to record the coherency state reported in the response.

The crossbar 34 may comprise circuitry configured to route communications between the various sources and destinations. The sources may include the SRQ 30 (a request scheduled by the SRQ control unit 32), the HT circuits 24A-24C, and the memory controller 22A. The destinations may include the SRQ 30, the HT circuits 24A-24C, the memory controller 22A, and the processor cores 18A-18B. Generally, received communications are routed to the SRQ 30 for later scheduling by the SRQ control unit 32. Communications scheduled from the SRQ 30 and transmitted to the crossbar 34 may include information identifying the destination or destinations for the communication, which the crossbar 34 may use to route the communications.

In the illustrated embodiment, the SRQ 30 may include a write port shared by the processor cores 18A-18B and a write port (or ports) used by the crossbar 34. The processor cores 18A-18B may be configured to transmit a communication (e.g. request or response) to the node controller at most once every other clock cycle. The communications may be captured in the flops 38A-38B and provided to the mux 36. The SRQ control unit 32 may control the mux 36 to write received communications from the flops 38A-38B into the SRQ 30 (or to update an existing entry of the SRQ 30, in the case of a response). If only one communication is received in a given clock cycle, the SRQ control unit 32 may select the corresponding flop 38A-38B through the mux 36. If two communications are received in a given clock cycle, the SRQ control unit 32 may select one flop 38A-38B in one clock cycle and, in the following clock cycle, select the other flop 38A-38B. With the maximum transmission of one communication every other clock cycle, there is time to handle both communications before a new communication may be received. In other embodiments, a direct path from the processor cores 18A-18B may be provided to the mux 36 in addition to the flops 38A-38B, if desired. In still other embodiments, a write port for each processor core 18A-18B may be provided on the SRQ 30 and the mux 36 may be eliminated.

More generally, a node 12A-12B may include N processor cores, where N is an integer greater than one. The processor cores may be configured to transmit a communication at most once every N clock cycles. Thus, N simultaneous communications may be captured and written to the SRQ 30 using a shared write port, similar to the above discussion.

The SRQ 30 may have any construction (e.g. registers, random access memory (RAM), etc.). In one embodiment, the SRQ 30 may comprise a shift queue storing various state information for each request, an address RAM storing an address provided in the communication, and a data RAM configured to store data associated with the communication (e.g. a cache block located by the address). Each shift queue entry may comprise a pointer to the address RAM and a pointer to the data RAM, locating the corresponding address and data for a communication (if any).

The SRQ 30 in the present embodiment may be a shared resource between the processor cores 18A-18B (as well as the HT circuits 24A-24C and the memory controller 22A). In one implementation, the entries of the SRQ 30 may be flexibly allocated based on the communications generated by each source. For example, each source may have one or more entries "hard allocated" for that source's use. The physical entries may not be allocated, but the number of entries hard allocated for that source may be guaranteed to be available to that source. The remaining entries may be considered to be a free list of entries, and any source may use the free list entries. For example, in one implementation, flow control may be in the form of a "coupon-based" scheme in which a given source has a token for each entry that the source may use. In such a scheme, each source may be allocated a free list token. The source may transmit a communication to the node controller 20A, and may indicate that a free list entry has been used. The node controller 20A may return the free list token to the source (indicating that it may use another free list entry) assuming there are still free entries to be used. The source may use one of its hard-allocated tokens if the free list token has not yet been returned. Thus, if one source is more active than others in generating communications, that source may consume more of the free list entries in the SRQ 30. If two or more sources are generating communications with a fairly equal frequency, the entries may be relatively equally divided between the two sources. Furthermore, as communication traffic patterns vary over time, the number of entries used by different sources may dynamically vary as well. The hard-allocated tokens may ensure that each requester may at least transmit the number of communications equal to the number of hard-allocated tokens even if other requesters are much more active in transmitting communications.

The node controller 20A may include a variety of registers that may be accessed (e.g. read and/or written) by the processor cores 18A-18B in response to executing instructions. The registers may include various configuration, control, and status registers. The processor cores 18A-18B may transmit the accesses (read operations and write operations) to the node controller 20A, similar to other communications. Generally, the registers may be referred to as processor-core addressable. The addressing may occur in any form. For example, the registers may be mapped into the address space of the processor cores, and thus performing a read or write operation to the mapped address may constitute addressing the register. Alternatively, special communication types or encodings may be assigned to certain registers, and transmitting a communication of the special type may be used to address the registers. Generally, a communication from a processor core 18A-18B may address a register having a logical definition that defines the contents for software interpretation and use. For example, the logical definitions may be specified in various hardware specifications that may be implemented by the nodes 12A-12B, including a processor instruction set architecture, various interface specifications such as the HT specification, etc.

Some of the logical registers may be the shared registers 44. The shared registers 44 may include logical registers that control operation of the node 12A as a whole or provide status for the node 12A as a whole. There may one physical register instance of such shared registers (e.g. the registers 46G and 46H may be physical register instances of two logical registers). The shared registers may be accessed independent of which processor core 18A-18B generates the access. The registers in the machine check control unit 42 may also be shared, although the values returned for reads to these registers may depend on which processor core 18A-18B transmits an access, in some modes. Other registers may be processor-core specific. That is, different physical register instances may be provided for each processor core 18A-18B. Alternatively, independent fields of a physical register may be provided for each processor core 18A-18B. For example, in the illustrated embodiment, the node controller 20A may include a separate APIC for each processor core 18A-18B. The APIC0 40A may correspond to the processor core 18A, for instance, and the APIC1 40B may correspond to the processor core 18B. Each APIC 40A-40B may include a separate instance of the logical registers included in an APIC.

The APICs 40A-40B may comprise circuitry and processor-core addressable registers (e.g. registers 46A-46D) as defined in the advanced programmable interrupt controller specification propagated by Intel Corporation (Santa Clara, Calif.). More particularly, the APICs 40A-40B may be local APICs assigned to each of the processor cores 18A-18B. Other embodiments may use any interrupt controller design.

The machine check control unit 42 may implement machine check functionality, at least for those machine check errors that are detected outside of the processor cores 18A-18B. Generally, machine check errors may be errors detected in the operation of the hardware itself. For example, error correction code (ECC) errors for memory accesses, communication transmission errors, cyclic redundancy check (CRC) errors, parity errors, and the like may cause machine check exceptions. The machine check control unit 42 may include one or more control and status registers that are processor-core addressable (e.g. registers 46E-46F). The control register(s) may be programmed to enable machine check operation, enable which hardware errors are monitored by the machine check mechanism, etc. Additionally, in one embodiment, the control register(s) may be programmable with a mode to determine how machine check exceptions are delivered to the processor cores 18A-18B. In one mode, all machine check exceptions are delivered to a selected processor core of the processor cores 18A-18B (e.g. a fixed one of the processor cores, or a programmable one indicated in the control register). In another mode, if the machine check error can be associated with a specific processor core 18A-18B (e.g. an error that occurred processing a communication from the processor core) then the machine check exception is delivered to the specific processor core 18A-18B. Errors that are not associated with a specific processor core 18A-18B may be delivered to a preferred processor core 18A-18B (either fixed or programmable, in various embodiments). Other modes may be implemented as well. The status registers may include an address (if an address is associated with the error, such as an ECC error detected during a memory access). That status registers may also include an error code, a source of the error (if applicable), an indication of whether the error is correctable or uncorrectable, etc. In some embodiments, multiple sets (or banks) of status registers may be provided to simultaneously record multiple errors.

When accessing a logical register in the node controller 20A, either of the processor cores 18A-18B may transmit the same address in the read/write operation to the node controller 20A. The address may be the address assigned to the logical register. For shared registers such as the shared registers 44, the address may be used to select the single physical register instance and the value returned (for a read) may be provided from that register or the update (for a write) may be written to that register. For processor-specific registers, the address may identify the logical register but the value returned (for a read) may also be dependent on which processor core 18A-18B generated the read operation. For example, a read of an APIC register may return the contents of the APIC register in the APIC 40A-40B that corresponds to the processor core 18A-18B that generated the read operation.

In the illustrated embodiment, the SRQ control unit 32 may detect the register accesses in the SRQ 30 and may communicate with the appropriate one of the APICs 40A-40B, the machine check control unit 42, and the shared registers 44 to complete the access. In other embodiments, one or more of the APICs 40A-40B, the machine check control unit 42, and/or the shared registers 44 may be a destination from the crossbar 34 and the access may be routed through the crossbar 34.

Figure 3:
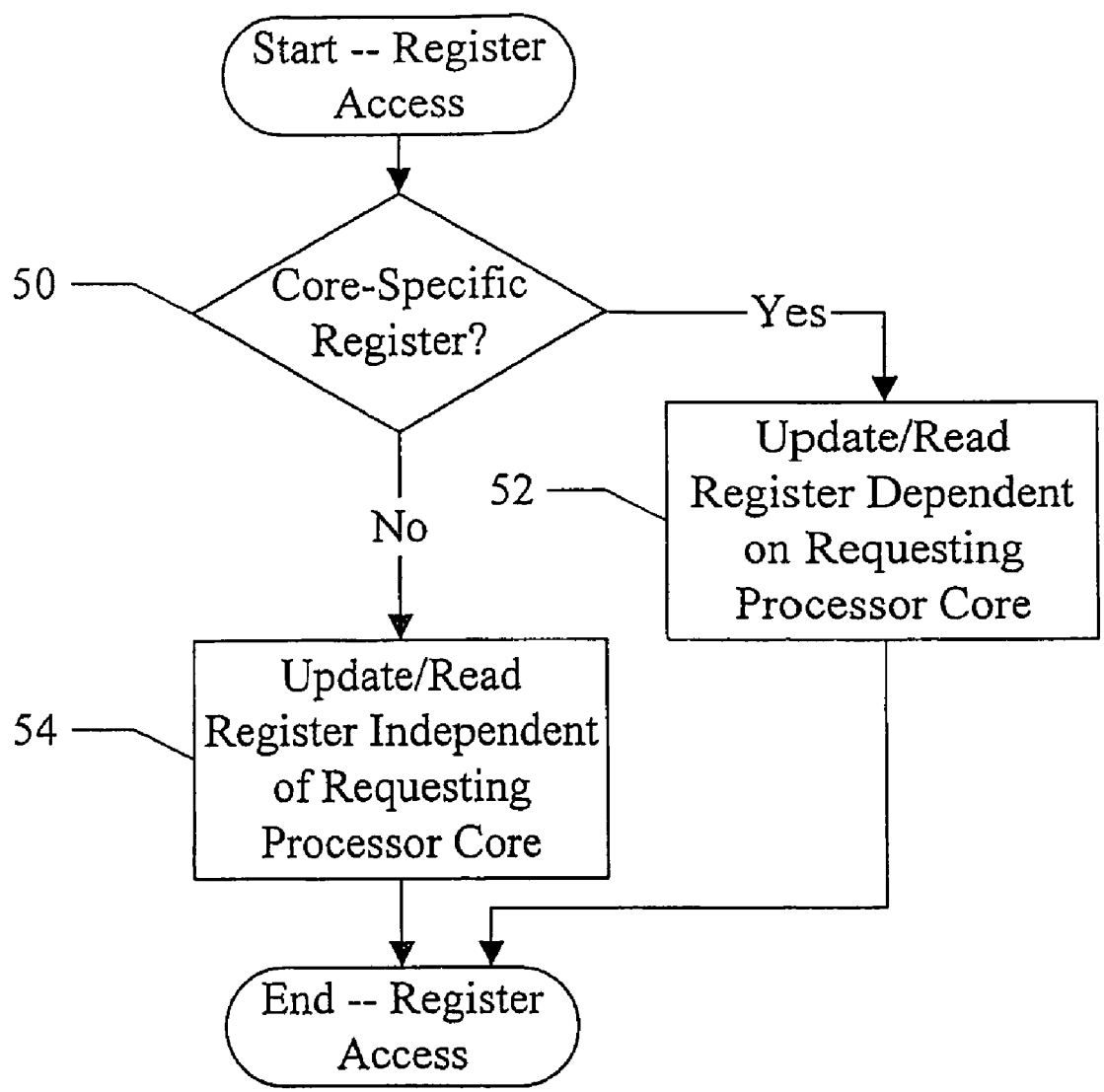
FIG. 3 is a flowchart illustrating high-level operation of one embodiment of a node controller in response to a register access.

FIG. 3 is a flowchart illustrating operation for register accesses at a high level for one embodiment of the node controller 20A (and more particular the SRQ control unit 32, for one embodiment). While the blocks shown in FIG. 3 are illustrated in a particular order for ease of understanding, any order may be used. Furthermore, blocks may be performed in parallel by combinatorial logic circuitry in the node controller 20A/SRQ control unit 32. In other embodiments, a block or blocks may be pipelined over multiple clock cycles or the flowchart as a whole may be pipelined.

The SRQ control unit 32 may determine whether the logical register being accessed is a processor-core specific register or not (decision block 50). If the register is processor-core specific (decision block 50, "yes" leg), the SRQ control unit 32 may update or read the physical register instance (or field of a physical register) dependent on the requesting processor core (block 52). In the case of a read, the value returned in response to the read may be dependent on which processor core transmitted the read operation. In the case of a write, the physical register instance (or field) that is updated may differ dependent on which processor core transmitted the write operation.

If the logical register is not processor-core specific (decision block 50, "no" leg), the SRQ control unit 32 may update or read the physical register instance independent of which processor core 18A-18B is the requesting processor core (block 54). In the case of a read, the value returned in response to the read may be read from the identified physical register instance, independent of which processor core 18A-18B transmitted the read. In the case of a write, the identified physical register instance is updated independent of which processor core 18A-18B transmitted the write operation.

Figure 4:
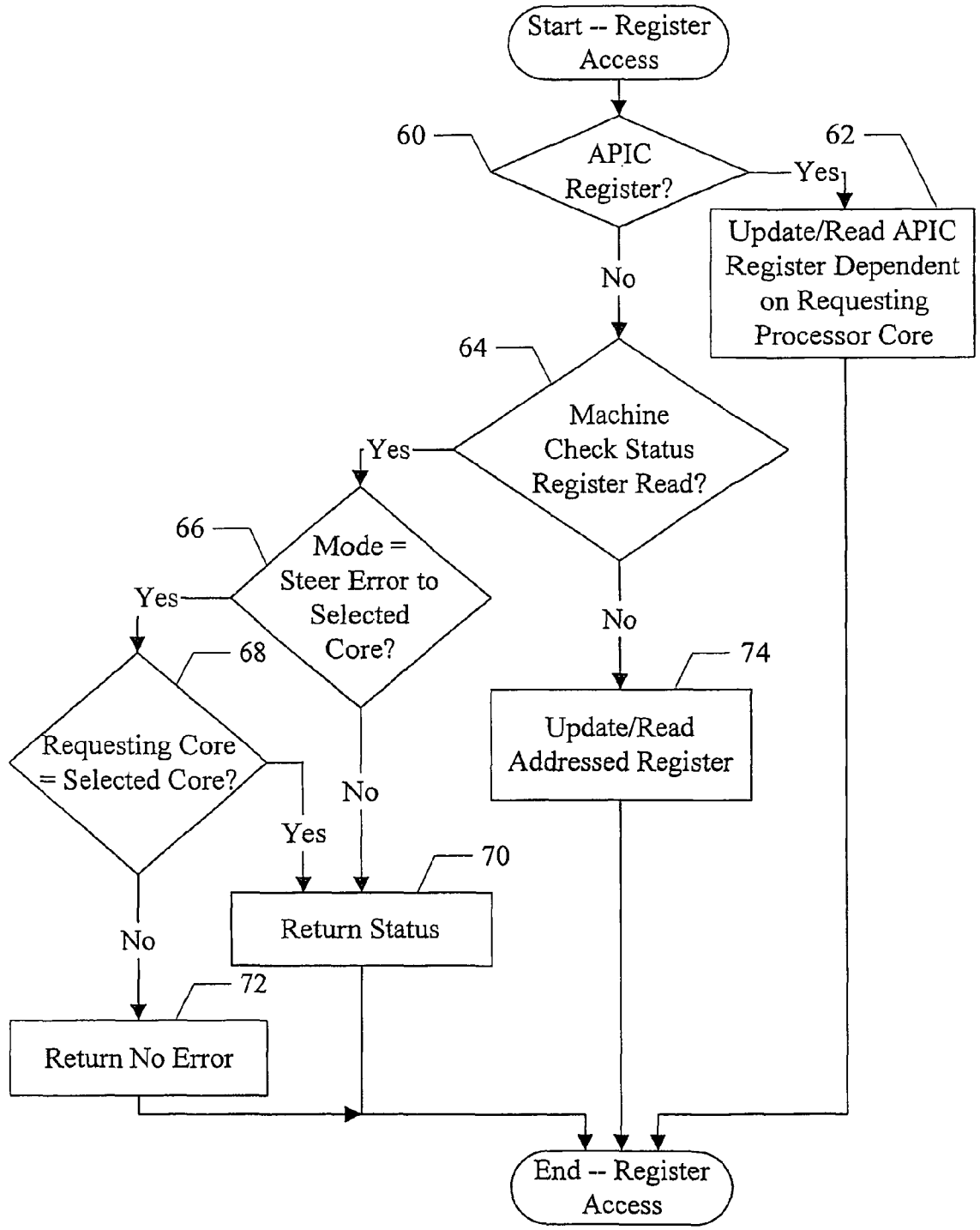
FIG. 4 is a flowchart illustrating more detailed operation of one embodiment of a node controller in response to a register access.

FIG. 4 is a flowchart illustrating more detailed operation for register accesses for one embodiment of the node controller 20A (and more particular the SRQ control unit 32, for one embodiment). While the blocks shown in FIG. 4 are illustrated in a particular order for ease of understanding, any order may be used. Furthermore, blocks may be performed in parallel by combinatorial logic circuitry in the node controller 20A/SRQ control unit 32. In other embodiments, a block or blocks may be pipelined over multiple clock cycles or the flowchart as a whole may be pipelined.

In the embodiment of FIG. 4, the value returned in response to a read operation of a logical register may be dependent on which processor core transmitted the read operation for APIC registers and the machine check status registers. Additionally, which register is updated in response to a write operation may be dependent on which processor core transmitted the write operation for the APIC registers.

If the SRQ control unit 32 detects that the access addresses an APIC register (decision block 60, "yes" leg), the SRQ control unit 32 may update (write operation) or read (read operation) an APIC register from one of the APICs 40A-40B dependent on which processor core 18A-18B transmitted the read/write operation (block 62). That is, the APIC register in the APIC 40A-40B that corresponds to the processor core 18A-18B that transmitted the read/write operation may be read/updated. Thus, in the case of an APIC register, the physical register instance selected to read/write (or the field in the register, in other embodiments) may be one of a plurality of instances (or fields) dependent on the requesting processor core 18A-18B. For example, one APIC register may store an APIC identifier (ID) that identifies the APIC in communication with other APICs. The APIC ID may differ between the APICs 40A-40B.

If the SRQ control unit 32 detects a read operation to a machine check status register (decision block 64, "yes" leg), the value returned in response to the read may be dependent on which processor core 18A-18B transmitted the read operation as well as on the mode of the machine check control unit 42. In particular, if the machine check mode is to steer machine check errors to a selected processor core independent of the source of the error (decision block 66, "yes" leg) and the requesting processor core 18A-18B (i.e. the processor core that transmitted the read operation) is the selected processor core (decision block 68, "yes" leg), the SRQ control unit 32 is configured to return the status stored in the machine check status register addressed by the read operation (block 70). If the machine check mode is to steer machine check errors to a selected processor core independent of the source of the error (decision block 66, "yes" leg) and the requesting processor core 18A-18B (i.e. the processor core that transmitted the read operation) is not the selected processor core (decision block 68, "no" leg), the SRQ control unit 32 is configured to return a status of no error independent of the contents of the machine check status register addressed by the read operation (block 72). If the machine check mode is not to steer machine check errors to a selected processor core independent of the source of the error (decision block 66, "no" leg), the SRQ control unit 32 is configured to return the status stored in the machine check status register addressed by the read operation (block 70).

For register accesses that do not address an APIC register or a machine check status register, the SRQ control unit 32 may update (write operation) or read (read operation) the single physical register instance addressed by the access (block 74). That is, the update/read is independent of which processor core 18A-18B transmitted the access.

Numerous variations and modifications will become apparent to those skilled in the art once the above disclosure is fully appreciated. It is intended that the following claims be interpreted to embrace all such variations and modifications.

What is claimed is:

1. A node comprising:
    a plurality of processor cores; and
    a node controller coupled to the plurality of processor cores, wherein the node controller comprises a queue shared by the plurality of processor cores, wherein the queue is configured to store communications transmitted by each of the plurality of processor cores to the node controller, and wherein the node controller is configured to schedule the communications from the queue for transmission out of the node;
    wherein the plurality of processor cores are configured to transmit communications at a maximum rate of one every N clock cycles, where N is an integer equal to a number of the plurality of processor cores.

2. The node as recited in claim 1 further comprising a plurality of interface circuits coupled to the node controller, wherein each of the plurality of interface circuits is configured to couple to a different interface for communicating external to the node, and wherein communications received in the plurality of interface circuits from the interfaces are stored in the queue.

3. The node as recited in claim 2 wherein the queue comprises a write port that is shared by the plurality of processor cores.

4. The node as recited in claim 3 wherein the queue comprises another write port used to write the requests received in the plurality of interface circuits.

5. The node as recited in claim 1 wherein the plurality of processor cores and the node controller are integrated onto a single integrated circuit chip.

6. A method comprising:

transmitting communications from a plurality of processor cores to a node controller, each of the plurality of processor cores transmitting communications at a maximum rate of one every N clock cycles, where N is an integer equal to a number of the plurality of processor cores; and receiving the communications in the node controller, wherein the node controller comprises a queue shared by the plurality of processor cores.

7. The method as recited in claim 6 further comprising scheduling the communications from the queue for transmission out of the node by the node controller.

8. The method as recited in claim 6 further comprising:

receiving communications in a plurality of interface circuits coupled to the node controller, wherein each of the plurality of interface circuits is configured to couple to a different interface for communicating external to the node; and storing communications received in the plurality of interface circuits from the interfaces in the queue.

9. The method as recited in claim 8 further comprising sharing a write port of the queue by the plurality of processor cores.

10. The method as recited in claim 9 further comprising writing requests received in the plurality of interface circuits via another write port of the queue.

* * * * *